Patented June 16, 1942

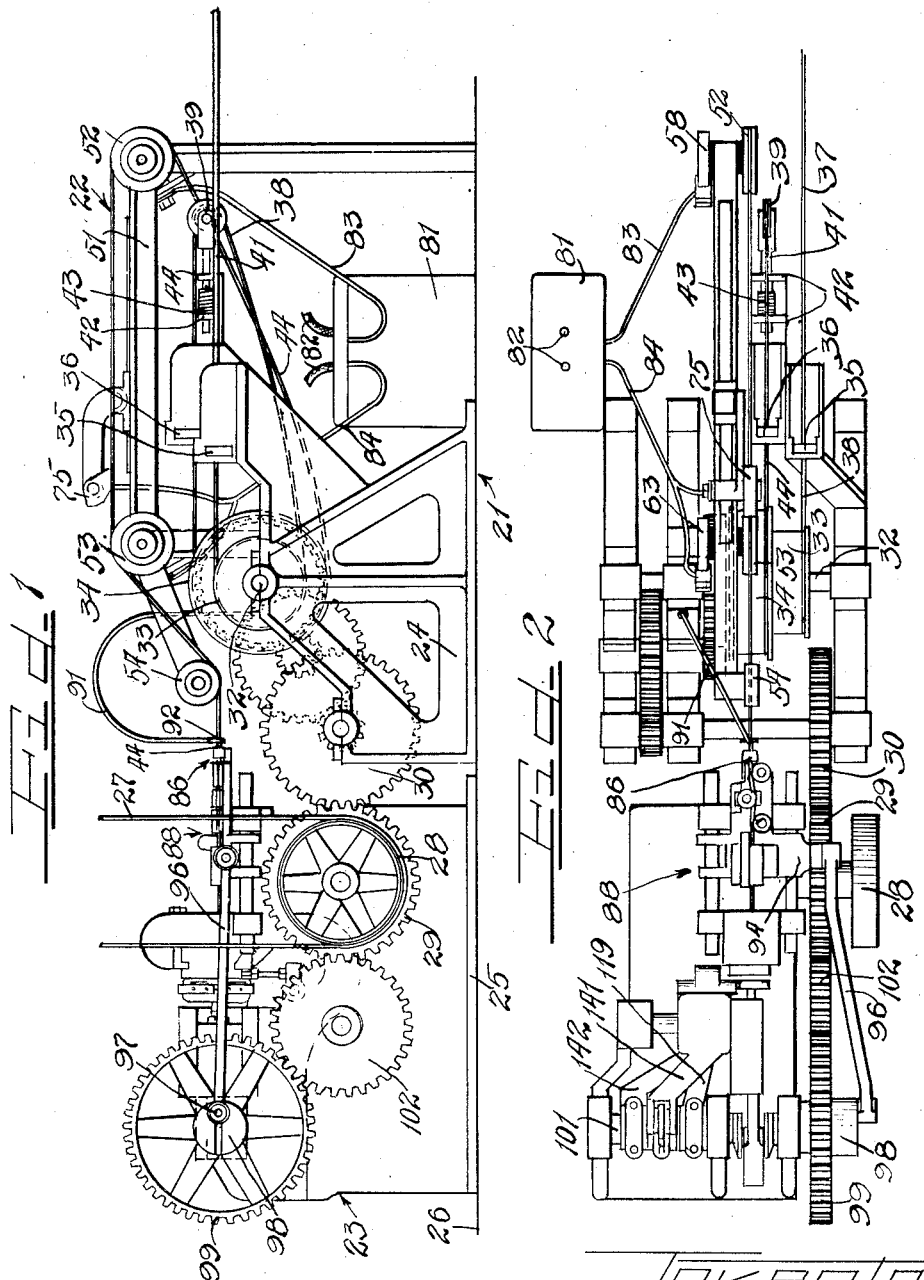

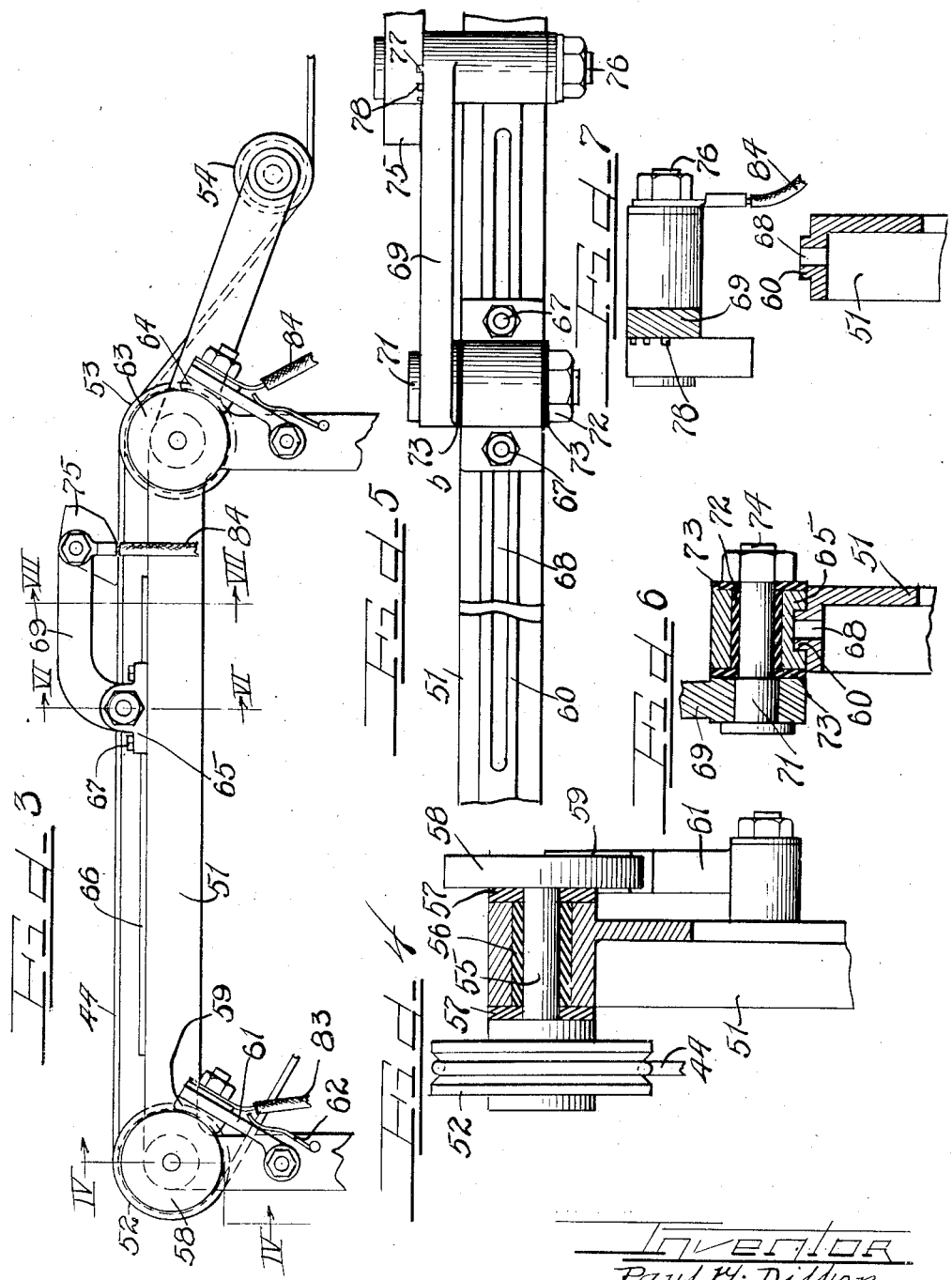

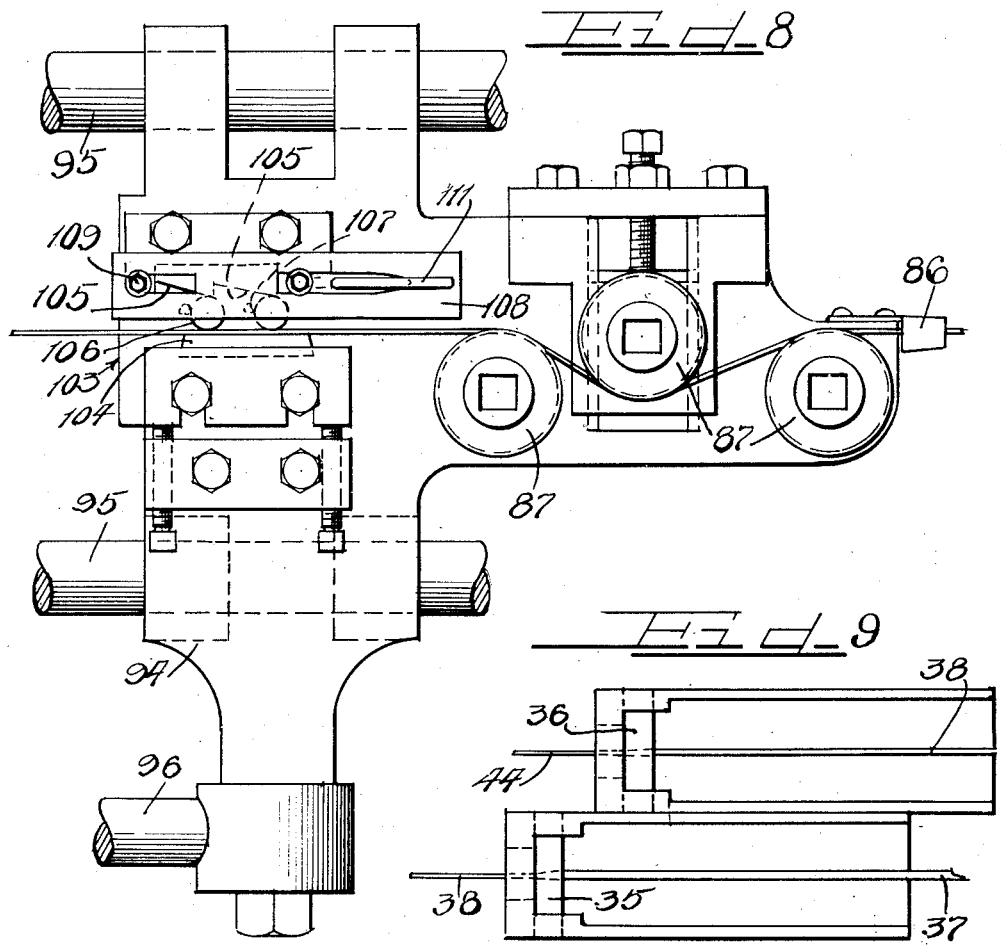

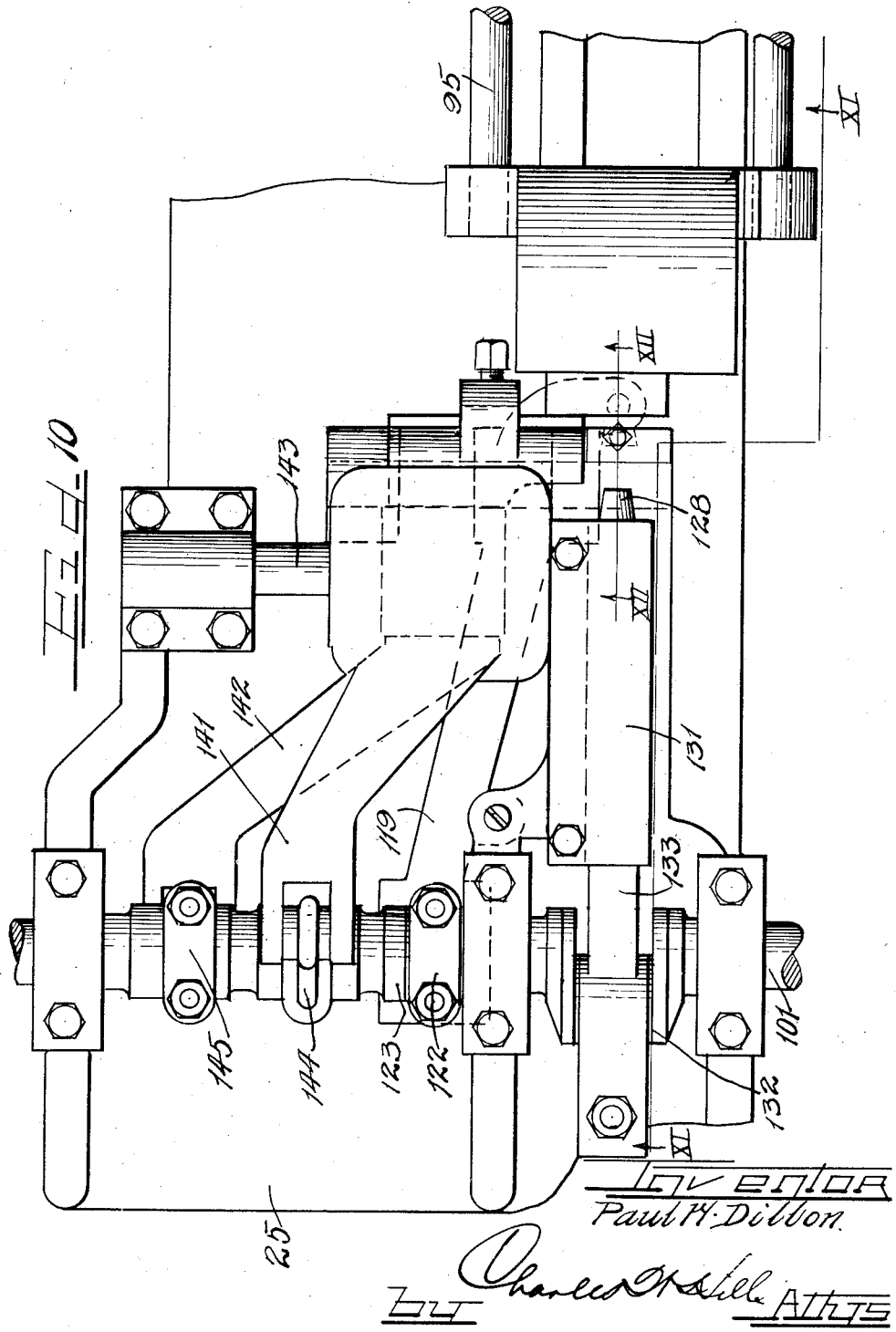

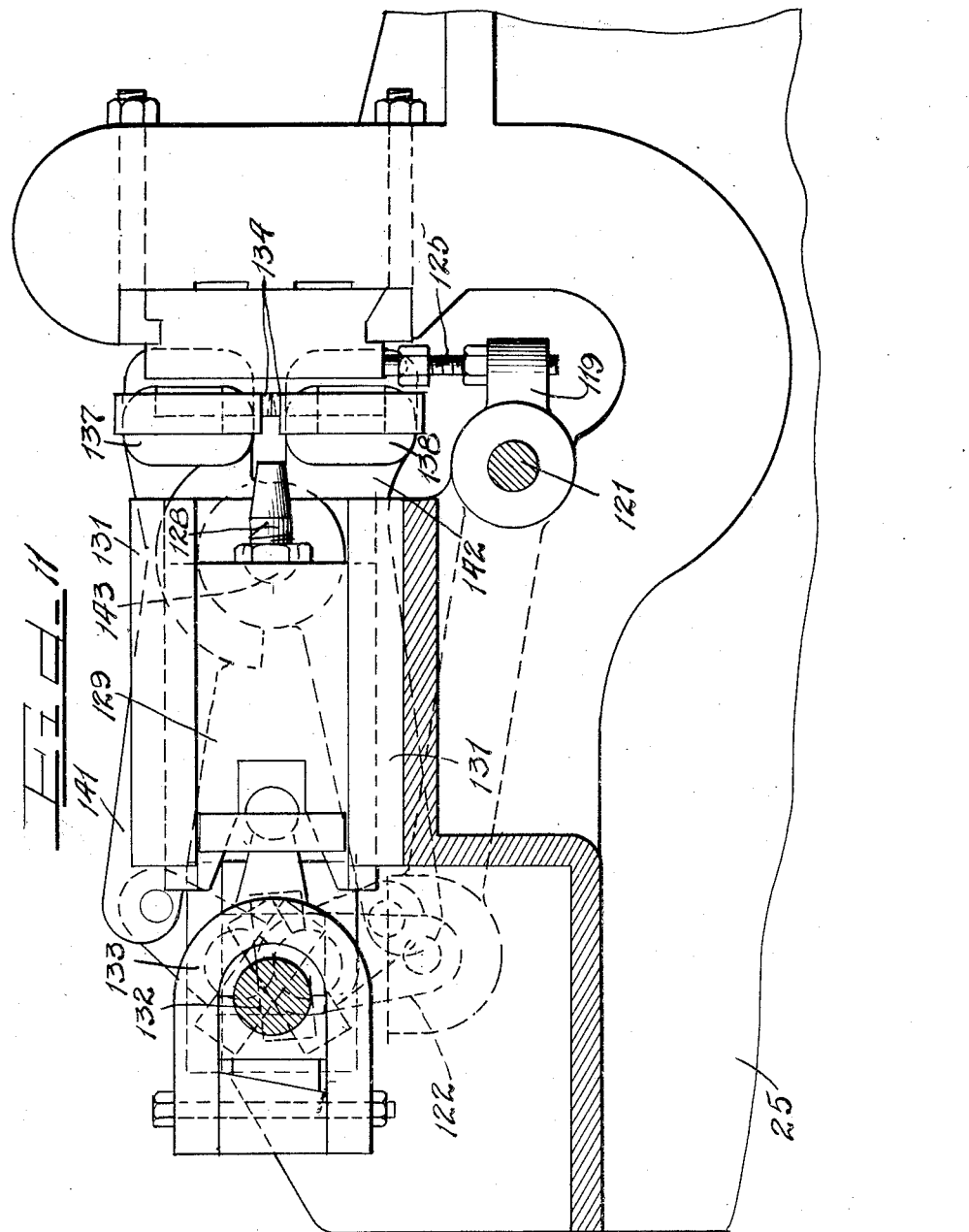

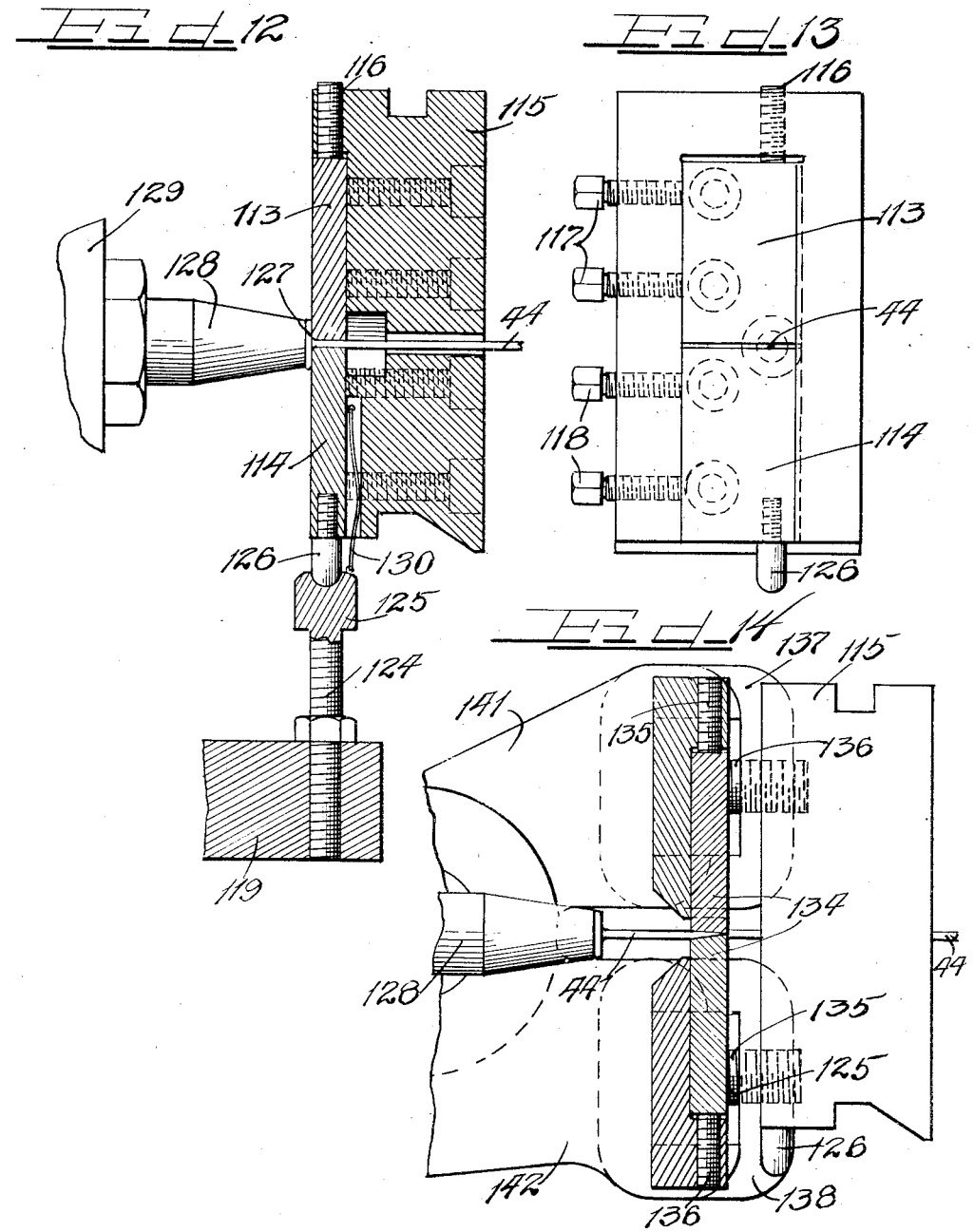

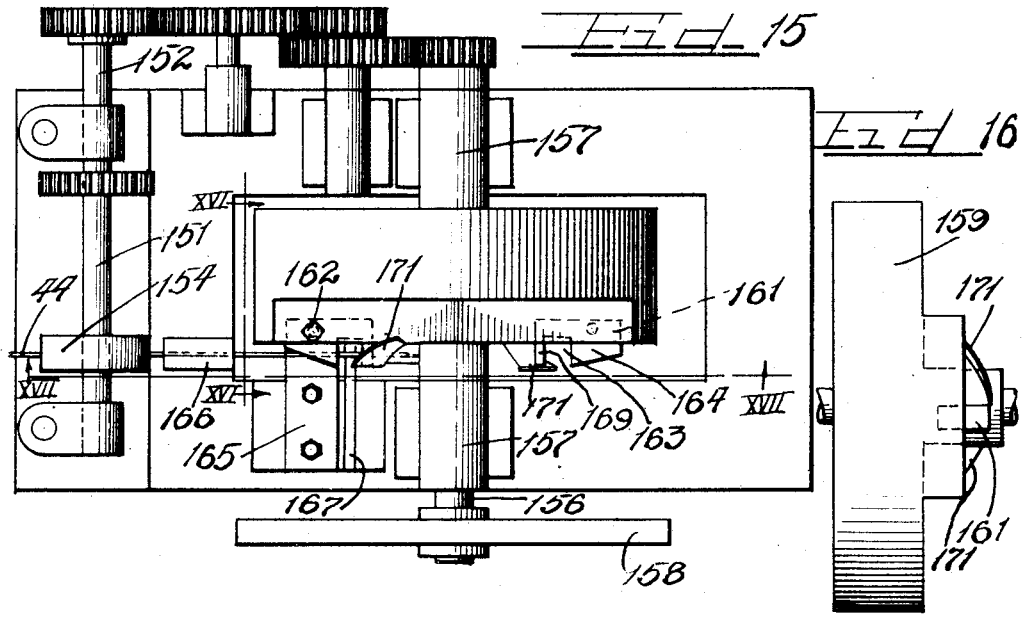
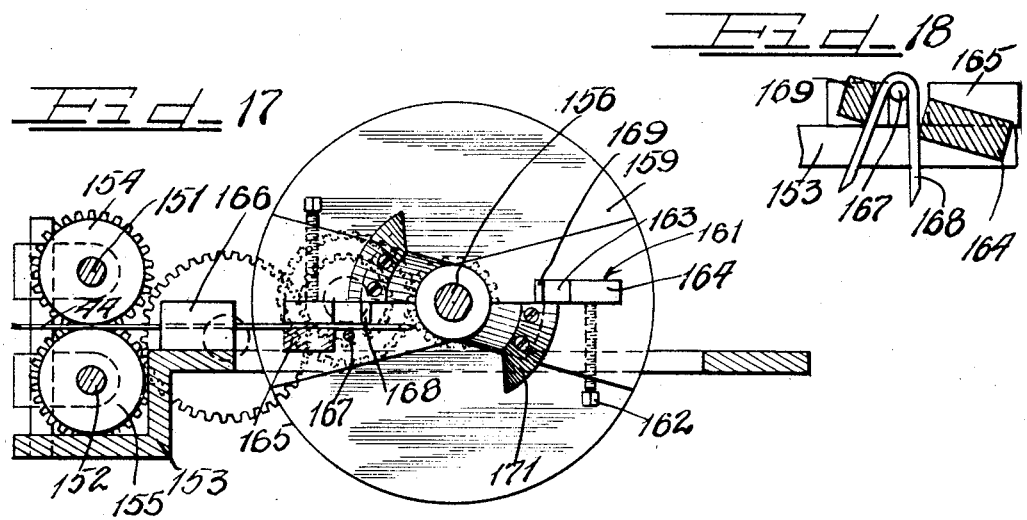

2,286,956

UNITED STATES PATENT OFFICE 2,286,956

METHOD OF AND APPARATUS FOR DRAWING WIRE AND FABRICATING ARTICLES THEREFROM

Paul W. Dillon, Sterling, Ill., assignor to Northwestern Steel and Wire Company, Sterling, Ill., a corporation of Illinois Application December 31, 1938, Serial No. 248,667

27 Claims. (Cl. 10—43)

This invention relates to a process of and apparatus for making wire products and more particularly to a process and apparatus in which the material to be processed consists of continuous rods substantially greater in diameter than the wire of the final article.

In the past the manufacture of wire articles has involved the purchase of wire on reels or the provision of a special plant or department with wire drawing facilities, wherein the wire had been drawn by one or more operations to the desired size and wound on reels which had thereafter been carried to another department containing the machine for fabricating the articles. Thereafter the reels had been mounted in position to cooperate with the desired fabricating or processing machines. As each reel of wire was used up by the fabricating or processing machine, it has been necessary to stop the machine, replace the empty reel with a full reel, and thread the wire from the full reel through the machine. In the last few years, a number of installations of machinery have been made which do away with the winding of the wire upon reels and with the labor involved in such winding and in transporting the reels from one department to another and which also do away with the stopping of the machine which is necessary when wire is fed to it from separate reels. These installations comprise combined wire drawing and wire processing or article forming machines, the combined machines taking in continuous rod stock, drawing it into wire and forming it into the finished article.

One of the principal objects of this invention is to provide an improved form of combined wire drawing machine and machine for fabricating wire articles or processing wire which is provided with a device for continuously heating the wire between the drawing stage and the processing stage. Another object of this invention is to increase the life of the dies or other wire forming members in a combined machine of the type described.

Another object of this invention is to provide a machine and a process for utilizing the heat generated when wire is drawn instead of allowing said heat to be wasted. Another object of this invention is to provide a machine of the type described which can run for longer periods of time without replacement of the dies or adjustment of the relative speeds of the various parts of the machine being necessary.

Another object of this invention is to provide a combined machine of the type described which can carry out steps in the formation of articles from wire which involves more deformation of the wire than has hitherto been possible in such machines.

Another object of this invention is to provide a combined machine in which the material on which the machine operates moves continuously through one portion of the machine and is partly fabricated and heated to the proper temperature for the performance of subsequent operations and in which the last portion of the machine intermittently draws in the heated and partly fabricated material, a take-up device being provided between the two portions of the machine to accumulate the slack produced while the second portion is not taking in material and to maintain the proper tension on the material leaving the first portion of the machine.

Another object of this invention is to provide a combined wire drawing and wire article fabricating machine in which the wire is drawn and heated continuously even though the wire article fabricating portion of the machine takes in wire intermittently, means being provided to maintain sufficient tension on the wire coming from the wire drawing mechanism to cause the wire drawing mechanism to draw wire practically continuously.

Another object of one form of this invention is to provide a combined machine for continuously drawing wire and annealing it to a temperature either above or slightly below the lower critical temperature and for fabricating it into articles while it is still hot enough from being annealed to be in a more plastic and easily workable condition than it would be if allowed to cool down to near ordinary atmospheric temperatures.

Another object of my invention is to provide a process and an apparatus for making nails with large heads, such as shingle nails, roofing nails and the like in which the heads are produced in a single operation without cracking around the edges and in which the heads are tough and strong.

Another object of this invention is to provide a combined machine of the character described in which the wire formed in the drawing section of the machine is electrically heated before passing through the wire fabricating or processing portion of the machine.

Another object of the present invention is to provide an improved simple and adjustable means for electrically heating continuously moving wire.

In accordance with the general features of the invention, the rod stock with which the machine is fed is mounted in coiled bundles on a rack and adjacent ends welded so as to enable the stock to be fed to the drawing mechanism without interruption. The stock is drawn through a die to a feed drum and about which it is wound, then about a tension device and through a second die by means of a second drum, which may be coaxial with the first drum. The number of drums, dies and tension devices may be varied, two dies having been found satisfactory for a certain size of wire desired to be processed. The wire from the second drum then passes through the electric heating device and from the electric heating device it may be fed continuously as in the manufacture of fencing, ties and other products, or it may be fed intermittently as in the manufacture of nails and the like, into the wire processing portion of the machine.

Other objects and features of this invention will more fully appear from the following description taken in conjunction with the accompanying drawings, which illustrates one of the preferred embodiments thereof, and in which:

Figure 1 is a side elevational view of one of the preferred forms of the apparatus of the present invention;

Figure 2 is a top plan view of the form of the apparatus shown in Figure 1;

Figure 3 is a side elevational view, on an enlarged scale, of a portion of the apparatus shown in Figure 1, and seen from the other side of the apparatus;

Figure 4 is a sectional view on a line IV—IV of Figure 3 with some parts shown in elevation;

Figure 5 is a plan view, on an enlarged scale, of a portion of the apparatus shown in Figure 3;

Figure 6 is a cross-section taken on the line VI—VI of Figure 3, looking in the direction of the arrow;

Figure 7 is a cross-section taken on the line VII—VII of Figure 3, looking in the direction of the arrows;

Figure 8 is a plan view, on an enlarged scale, of a portion of the apparatus shown in Figure 1;

Figure 9 is a plan view, on an enlarged scale, of a portion of the apparatus shown in Figure 1;

Figure 10 is a plan view, on an enlarged scale, of another portion of the apparatus shown in Figure 1;

Figure 11 is a section on the line XI—XI Figure 10 looking in the direction of the arrows;

Figure 12 is a section on the line XII—XII of Figure 10 looking in the direction of the arrows and with certain parts omitted;

Figure 13 is a face view of the parts shown at the right of Figure 12;

Figure 14 is a section on the line XII—XII of Figure 10 looking in the direction of the arrows and showing parts omitted in Figure 12 and showing other parts in elevation;

Figure 15 is a plan view of a portion of a modified form of the apparatus;

Figure 16 is a side view of a portion of the machine shown in Figure 15 looking in the direction of the arrows from the line XVI—XVI;

Figure 17 is a cross-section on a line XVII—XVII of Figure 15, looking in the direction of the arrows;

Figure 18 is an enlarged cross-sectional view showing one step in the operation of the machine shown in Figure 15.

The embodiment of the invention shown in Figures 1 to 14 comprises three main portions, a wire drawing machine 21, a heating device 22, and a wire processing machine 23 which, in this particular machine, is a nail making machine. These three portions of the combined machine may be mounted upon a common sub-frame, or, as shown, the wire drawing machine 21 and the nail making machine 23 may have separate frames 24 and 25 mounted on a solid foundation 26, and the heating device 22 may be mounted partly upon the foundation 26 and partly upon the frame 24 of the wire drawing machine.

The wire drawing machine 21 and the nail making machine 23 are provided with a common drive so that they will start and stop together at the begining and end of the working day and so that they will remain in synchronism while they are working. This drive is from an overhead countershaft (not shown) by means of a belt 27 to a pulley 28 mounted upon one of the machines. Pulley 28 drives a gear 29 which drives both the nail making machine 23 and the wire drawing machine 21.

The drive of the wire drawing machine 21 comprises a train of gears, the first of which, 30, meshes with the gear 29 and the last of which drives a shaft 32 to which are fixed drums 33 and 34 which draw the wire through dies 35 and 36.

The material to be drawn is conveniently in the form of hot rolled rod stock which may be supplied in coiled bundles. One or more of these are supported in a ring (not shown) preferably vertically, and at any time prior to consumption of an entire bundle by the wiring drawing mechanism, the unused end of the bundle is welded to an end of another bundle, and the burr or flash removed. Thus the drawing and other mechanism may operate as long as desired without interruption, as far as the supply of material is concerned.

The reduction in size of the rod stock in order to form wire of the proper size for producing the finished article may be such as to require either one or more drawing operations. In the embodiment of the invention illustrated, two drawing operations are employed. The stock 37 is drawn through the first and larger die 35 thereby forming a strand 38 of reduced thickness. The reduced strand 38 thus formed encircles the smaller drum 33 several times so that the frictional contact between it and the drum will be enough to enable the stock 37 to be drawn through the die 35.

The strand 38 extends away from the drum 35 and passes about a sheave 39 rotatably carried on the end of a rod 41. The rod 41 is slidably mounted in guides 42 carried on the frame 24 of the machine and is resiliently urged outward by means of a spring 43 acting between one of the guides 42 and an abutment on the rod 41.

After the strand 38 passes around the sheave 39, it enters the second and smaller die 36 which reduces it down into wire 44 of the proper size for the fabrication machine 23. The wire 44 is drawn from the die 36 by means of the larger drum 34 about which it is wound several times.

The parts are so dimensioned that the volume of wire feeding the larger die 35 and wound around the smaller drum 33 is equal to the volume of wire issuing from the smaller die 36 and wound around the larger drum 34.

In order to maintain this relation, the product of the area of the opening in the smaller die 36 and the sum of the diameters of the larger drum

34 and the wire wound on it should be equal to the product of the area of the opening in the larger die 35 and the sum of the diameter of the smaller drum 33 and the wire wound on it.

The mathematical relation between the drum and die sizes given in the preceding paragraph is theoretically correct, but it is impossible to maintain this relation in practice because the dies wear as they are used and wear at different rates, the smaller die wearing much faster. Therefore, the smaller drum is dimensioned so as to draw a slightly greater amount of wire than the larger drum and to gradually build up slack in the wire between the two stages of drawing. When this takes place there is insufficient tension on the wire around the smaller drum so that the latter slips in the wire until the larger drum pulls the wire taut enabling the smaller drum to draw again. Each time that the wire begins to slip on the smaller drum 33 and the slack between the two drums is taken up by the larger drum, there is a jerk which might snap the wire if provision were not made for relieving the stress caused by the jerk. This relief of the stress is provided by the resiliently mounted sheave 39.

From the larger drum 34 of the wire drawing mechanism 21, the wire 44 passes to the heating device 22. As shown in Figures 3 to 7, this device comprises a frame 51 carrying three sheaves 52, 53 and 54. The first two sheaves 52 and 53 are similarly arranged and are mounted so as to be insulated from the frame 51 as shown in Figure 4. As shown in this figure, the sheave 52 is carried on a shaft 55 which is insulated from the frame 51 by means of a cylindrical sleeve 56 and a pair of washers 57 of insulating material. The shaft 55 also carries a contact disk 58 whose periphery fits into or against the concave surface of a brush 59. The brush 59 is carried by an arm 61 pivoted to the frame and is pressed into contact with the disk 58 by means of a suitable spring 62. The sheave 53 is similarly provided with a contact disk 63 and a brush 64. The third and last sheave 54 is a plain uninsulated sheave which serves to hold the wire in position on the second sheave 53 and to guide it toward the wire fabricating machine 23.

Between the two insulated sheaves 52 and 53, the frame 51 carries a bracket 65 which fits over a rib or feather 66 extending along the top of the frame 51. The bracket 65 is held in place by a pair of bolts 67 which extend through a slot 68 in the frame. This arrangement allows the bracket 65 to be slid along the frame 51 and to be secured in any position thereon.

An arm 69 is adjustably fixed or secured to the bracket 65 by means of a bolt 71 and nut 72. An insulating sleeve 73 lines the hole in bracket 65 through which the bolt 71 extends and insulating washers 74 lie between the bracket 65 and the arms 69 and the nut 72, thus completely insulating the arm 69 from the bracket 65.

The end of the arm 69 carries the brush 75 which is polygonal in form and composed of any suitable material such as carbon. The brush 75 is secured to the arm 69 by means of a bolt 76 and is set in any of its several positions relative to the arm by means of a pin 77 on the arm which fits into any one of a plurality of slots 78 on the brush. The slots 78 are arranged so that when each slot is placed in position over the pin 77, one of the sides of the polygonal brush will lie flat on the wire 44. The various sides of the brush are made of different widths, so that by adjusting the position of the brush, the length of contact between the brush and the wires may be varied. By this means, the resistance of the contact between the brush and the wire may be varied and the current flowing from the brush through the wire may be controlled thereby.

As shown in Figure 1, the current for the heating device is supplied by means of a transformer 81 connected to any suitable source of electric power by means of a pair of leads 82. One side of the secondary is connected by means of a wire 83 to the carbon brush 59 which is associated with the sheave 52. The other side of the secondary of the transformer 81 is connected by means of a wire 84 to both the brush 59 which is associated with the other insulated sheave 53 and to the polygonal brush 75 which makes direct contact with the wire 44 being heated.

When the transformer 81 is supplied with current through the connections 82, the secondary of the transformer will cause a current to flow through the connection 83 to the brush 59 and the contact disk 58. The current will then flow through the shaft 55 and the sheave 52 to the wire 44 being annealed and will travel through the wire until it reaches the polygonal brush 75. From the brush 75, the current will return through the connection 84 to the secondary of the transformer 81. By a suitable choice of the transformer ratio and the distance between the sheave 52 and the polygonal brush 75 and by properly proportioning these factors to the size or cross-sectional area of the wire 44, its resistance characteristics and the speed at which it passes through the heating device from the sheave 52 to the polygonal brush 75, the wire 44 can be caused to heat up to exactly the proper temperature as it travels through the heating device. Thus it can be raised to the minimum temperature to produce the desired change in the wire and the formation of scale on the wire largely avoided.

The connection of the second insulated sheave 53 to the same side of the transformer secondary as the polygonal brush 75 is not absolutely necessary, but I have found that the device operates much more evenly and satisfactorily with such a connection. The reason for this is not thoroughly understood, but it is believed that this connection provides an alternate path in parallel with the contact between the wire being heated and the brush 75 and that the existence of this alternate path greatly minimizes the variation in the current that might otherwise be caused by momentary variation in the resistance of the contact between the polygonal brush 75 and the wire 44.

From the last sheave 54 of the heating device 22, the wire 44 travels to a fairlead or guide 86, mounted on the wire fabricating or processing machine 23. In the particular form of the invention illustrated in which the wire fabricating or processing machine 23 is a nail making machine, the wire 44 passing from the fairlead 86 goes through a group of wire straightening rollers 87 to a wire feeding mechanism 88 shown in Figure 8. The wire feeding mechanism 88 is of the type which feeds the wire into the nail making machine intermittently. The wire 44 is thus taken into the nail making machine 23 in an intermittent or non-continuous fashion whereas it is essential that it be taken from the wire drawing machine 21 and through the heating device 22 smoothly and continuously. To accomplish this, I have provided a slack takeup device between the last sheave 54 on the heating device and the fairlead 86 on the nail making machine as shown in Figures 1 and 2.

The slack takeup device comprises a U-shaped spring 91 which has one end fixed to the frame of one of the machines and whose other end is formed into an eye 92 through which the wire 44 passes. The spring 91 is adjusted so that it can pull the wire 44 out of the straight line between the last sheave 54 on the annealing device 22 and the fairlead 86 on the nail making machine so that any slack in the wire between these points will be taken up by the spring 91. Thus, during the intervals when the nail making machine 23 is not taking in wire, slack will be created and will be taken up by the spring 91. During the rest of the time when the nail making machine 23 is taking in wire, it will take in whatever slack has accumulated since wire was last taken into it.

The intermittent feeding mechanism of the nail making machine comprises a crosshead 94 slidably mounted upon a pair of rods 95 carried by the frame 25 of the machine. The crosshead 94 is reciprocated by means of a connecting rod 96 pivoted at one end on the crosshead 94 and at the other end on a crank pin 97 adjustably mounted on the hub of a large gear 99, as shown in Figure 1.

The gear 99 is carried on a shaft 101 which forms the crankshaft of the nail making machine and is driven through an intermediate gear 102 from the drive gear 29 of the combined machine. The adjustment of the crank pin 97 is provided by securing the crank pin in a T-slot which extends across the face of the hub 98 and arranging it so that it may be secured at any point in this slot. Thus, by adjusting the position of the crank pin 97, the stroke of the crosshead 94 may be adjusted and the amount of wire fed at each revolution of the crankshaft 101 may be adjusted to what is necessary for the manufacture of the particular size of nail for which the machine is set.

The crosshead 94 carries a roller clutch mechanism 103 which grips the wire whenever the crosshead is moving away from the wire drawing machine 21 and annealing device 22 and which releases the wire or allows it to slip whenever it is moving in the opposite direction. The roller clutch mechanism 103 comprises an anvil 104 facing a pair of inclined cam surfaces 105. Each of the cam surfaces 105 has associated with it a roller 106 whose diameter is such that when they are near the top of the cam surfaces 105 they press tightly against the anvil 104. The wire 44 passes between the rollers 106 and the anvil 104 and the cam surfaces 105 slope in a direction which will cause them to grip the wire 44 tightly during the feeding strokes of the crosshead 94. The rollers 106 are also urged to roll up their cam surfaces 105 by means of a pair of pins 107 which project down alongside of them and which are carried by a plate 108 slidably carried by a pair of bolts 109. The plate 108 is urged in a direction which moves the rollers 106 into contact with the wire by means of an upright loop of spring wire 111. This insures that the rollers 106 will grip the wire 44 immediately at the beginning of each feeding stroke of the crosshead 94, thus insuring the feeding of a uniform length of wire at each stroke.

From the feeding mechanism 88, the wire 44 passes between a pair of gripping members 113 and 114 which also serve as the anvil against which the head of the nail is formed. The upper gripping member 113, as shown in Figures 12 and 13, can be adjusted vertically in a stationary anvil base member 115 by a setscrew 116 and is secured in place by a pair of horizontal setscrews 117. The lower gripping member 114 is also provided with horizontal setscrews 118 bearing against one of its edges, but these setscrews are set so as to allow the member 114 to slide vertically. The lower gripping member 114 is reciprocated vertically by means of a lever 119 which is pivoted on a shaft 121 carried by the frame 25 of the machine. The longer arm of the lever 119 is connected by a link or connecting rod 122 to one of the cranks 123 on the crankshaft 101. The short arm of the lever 119, as shown in Figures 11 and 12, carries an adjustable stud 124 with a cup-shaped head 125.

A stud 126 is screwed into the bottom of the lower gripping member 114 and its outer or projecting end is rounded and fits into the cup-shaped head 125 of the stud 124. Thus, whenever the crank 123 moves the long arm of the lever 119 down, the short arm will rise and the two studs 124 and 126 will push the lower gripping member 114 tightly against the wire 44 lying between it and the upper gripping member 113, thus holding the wire 44 so that its projecting end can be upset to form a nail head 127 by a punch 128, as shown in Figure 12. The head of the stud 125 is also fastened to the lower gripping member 114 by means of a member 130 so that when the short arm of the lever 119 moves down, the lower gripping member 114 will be pulled down and will release the wire 44, allowing it to be fed forwardly.

The punch 128 which forms the head on the nail is carried by a slide 129 as shown in Figure 11, the slide 129 being reciprocably carried in guides 131 mounted on the frame 25. The punch 128 and the slide 129 are moved back and forth by means of a crank 132 forming part of the crankshaft 101, and connected to the slide by means of a heavy pitman or connecting rod 133.

The parts of the machine are so adjusted that after the head 127 is formed on the end of the wire 44, the punch 128 moves back when the gripping members 113 and 114 separate slightly and allow the feeding mechanism 88 to adapt the wire 44 the distance required to make one nail. This places the wire 44 in the position shown in Figure 14 whereupon it is simultaneously cut off and provided with a point by a pair of cutoff dies 134. The dies 134 are secured by setscrews 135 and 136 in the jaws 137 and 138 of a huge scissors-like device formed of two levers 141 and 142. The two levers 141 and 142 are pivoted to each other by a pin or shaft 143. The shaft 143 is secured to the frame 25 as shown in Figure 10 and also serves to support the levers 141 and 142 and the jaws 137 and 138 in the proper position. The levers 141 and 142 do not cross each other as do the parts of an ordinary pair of scissors, but the upper lever 141 is connected directly to the upper jaw 137 and the lower lever 142 is connected directly to the lower jaw 138 as shown in Figure 11. The ends of the two levers 141 and 142 are connected by short connecting rods or pitmans 144 and 145 to cranks on the crankshaft 101, the cranks being arranged so that they will separate the levers 141 and 142 and cause the jaws 137 and 138 to move together, carrying the dies 134 and cutting off and forming the point of a nail immediately after the feeding mechanism 88 has moved the wire 44 forward. It will be noted from Figure 14 that the cutoff dies 134 cut the wire 44 off so that a sufficient amount of wire is left projecting out ahead of the block 115 to form the head of the next nail. Thus, at each cycle or revolution of the crankshaft 101 of the nail making machine, the punch 128 comes forward and upsets the projecting end of the wire 44 to form a nail head 127, the gripping members 113 and 114 separate slightly and allow the wire 44 to be fed forward by the feeding mechanism to the position shown in Figure 14, and the cutoff dies 134 cut off and form the point on a nail at the same time that the gripping members 113 and 114 are gripping the wire 44 in a new position. Thus each cycle of operation produces one nail.

This invention, however, is not limited to a combination which includes a nail making machine. For example, the nail making machine may be replaced by a staple making machine such as is shown in Figures 15 to 18. This machine comprises a pair of shafts 151 and 152 carried by a frame 153 and geared together so that they will rotate in opposite directions and at the same speed. The shafts 151 and 152 carry a pair of feed wheels 154 to 155 whose peripheries are close enough together so that they will tightly grip between them a wire 44 being fed through the machine. The shafts 151 and 152 bearing the feed wheels 154 and 155 are geared to the main shaft 156 of the machine so that in each half revolution of the main shaft 156 the proper length of wire to form one staple will be fed. This ratio is necessary because the machine is arranged to make two staples for each revolution of the main shaft. The main shaft 156 is journaled in bearing 157 mounted on the frame 153 and carries a large flywheel 158 at one side of the machine. At the center of the machine, the main shaft 156 carries a large drum 159 which carries the moving parts of the staple making mechanism. The moving parts are arranged in duplicate, one set being arranged on each half of the face of the drum 159, so that as the drum revolves, the set of parts will alternately come into action. Each set comprises a shear plate 161 set into a slot in the face of the drum 159 and secured by a setscrew 162. The part of the shear plate 161 which projects out of the slot in the drum 159 is divided into two portions by a deep slot or notch 163. One portion 164 of the shear plate 161 has a long sharp sloping edge which cooperates with a similar edge on a stationary shear plate 165, fixed to the frame of the machine to form a pair of shears. At each revolution of the drum 159, the shearing portion 164 of each of the shear plates 161 carried by the drum sweeps by the edge of the stationary shear plate 165. The wire 44 is fed by the feed wheels 154 and 155 through a guide 166 and over the diagonal edge of the stationary shear plate 165, and is thus sheared off on a long slant each time that one of the moving shear plates 161 passes by the stationary shear plate 165. Thus two lengths of wire are cut off for each revolution of the drum 159 for the formation of two staples.

Since each time that the wire 44 is cut off by the shear plates 161 and 165, it is cut off on a long slant, both ends formed by each cut will be pointed, and each piece of wire will therefore be pointed at each end. After the wire is thus cut and pointed, the only operation which remains to be formed upon it in order to produce a staple is to bend it into U-shape.

The bending of the staple is accomplished by the cooperation of the moving shear plate 161 with a stationary mandrel 167 carried by the frame 153. The mandrel 167 is horizontal and parallel to the main shaft 156 of the machine and its end lies directly under the middle of the piece of wire 168 which is cut off by the shear plate at each half revolution of the drum 159. The notches 163 in the moving shear plates 161 are located so that the two portions 164 and 169 of each shear plate at the sides of the notches 163 pass on either side of the mandrel 167. As this happens, the two ends of the wire 168 are bent down around the mandrel 167 as shown in Figure 18, thus forming a completed staple.

Fixed to the drum 159 near each cutter plate 161 is a cam plate 171 whose purpose is to remove the formed staple 168 from the end of the mandrel 167. Each cam plate 171 is arcuate in shape and is positioned so that its outer edge passes just inside of the mandrel 167. As may be seen from Figures 15 and 16, the cam plates 171 are mounted in a position oblique to the plane of the drum 159, so that as their outer edges sweep by the mandrel 167, they will engage any staple 168 that may be on it and pull it off of the end of the mandrel and allow it to drop into a suitable receptacle. Thus in each half revolution of the main shaft 156 and the drum 159, a staple is formed and removed from the machine to allow another staple to be formed during the next half revolution.

In operating combined wire drawing and wire processing machines, it has been found most practical to adjust the relative speed of the two portions of the combined machine so that the wire drawing portion of the machine will normally supply wire at a slightly greater rate than it will be utilized by the fabricating or processing portion of the machine. Then, as the combined machine operates, the slack between the two portions of the machine gradually increases until it is greater than can be taken care of by the slack takeup device. When this occurs, the tension in the wire leading from the wire drawing portion of the machine becomes insufficient to keep the wire wound tightly on the drum 34. This allows the wire to slip for a moment on the drum 34, and during this slipping the fabricating portion of the machine continues to take in wire while the wire drawing portion does not produce any. Thus the excess slack is periodically taken up whenever it accumulates. However, a machine built according to my invention may be adjusted so that this slippage is entirely unnecessary. To do this, the two portions of the machine are geared together so that the wire drawing drum 34 will provide not quite as much wire as is required by the wire processing machine 23. The difference in length between the wire being drawn and the wire being processed or fabricated is made up by a slight stretching of the wire as it passes through the heating device 22. Since the wire in this device becomes heated up to a dull red heat, it readily stretches the slight amount that may be necessary. Since this stretching takes place in the portion of the wire which is in a plastic condition, it causes no change in the final physical properties of the wire.

In the various forms of my invention, the heating device may be adjusted in accordance with the characteristics desired in the final product and in accordance with the severity of the operations which are to be performed on the wire in the fabricating portion of the machine. For example, if the final product is to be a nail made of ten point carbon steel, the heating device may be adjusted to heat the wire to a temperature between 850 and 1100 degrees F. The exact temperature will depend on how hard the nail is to be and how large a head the nail is to have, but 900 degrees has been found to give excellent results in the manufacture of such nails as shingle nails of the above carbon content and having a head about two and a half times the diameter of the shank. It has been found that heating the wire to this temperature after it has been cold drawn in the drawing part of the machine is sufficient to allow the ferrite, which comprises the major part of ten-point carbon steel, to partly recrystallize in its normal polyhedral pattern and to remove the internal stresses in the steel and restore its ductility enough to allow the end of the wire to be successfully upset into a head of the desired size by a single blow. The degree of recrystallization is, of course, dependent on the temperature and is greater with higher temperatures.

It has been found that the heads of nails produced by this process are much tougher than the heads of nails produced by previously known processes and that they are much less likely to crack off as the nails are being driven or withdrawn. This appears to be attributable to the fact that the head is formed while the steel is still hot and that the crystals of ferrite in the iron may recrystallize at least to some extent after they have been deformed in the upsetting of the head. This restores ductility and toughness and freedom from internal stresses to the metal forming the head of the nail. This recrystallization of the metal in the head of the nail during and after upsetting is facilitated by the heat generated in the head itself as it is being upset, this heat being added to the heat already present and remaining from the heating which takes place in the electric heating portion of the machine.

During the recrystallization of the ferrite in the temperature range given above, the pearlite in the steel does not recrystallize, as the temperature range is below the critical temperature range, but the pearlite remains in the form to which it has been distorted, broken up and distributed by the cold working received in the wire drawing operation. It is believed that this is the reason why nails made by my new process are considerably harder than if the wire had been annealed to a temperature above the critical range. The result of the entire process as thus applied to nails is to produce nails having a fine structure of practically uniform grain size throughout the head and the shank, a large portion or all of the ferrite being disposed in small polyhedral crystals and the pearlite being evenly distributed. The nails thus produced have a combination of toughness and hardness which has hitherto been unattainable by commercially practical processes.

The temperatures mentioned above are given only by way of example. For nails which have larger heads or which may be softer than shingle nails, higher annealing temperatures may be employed. For example, roofing nails having heads whose diameter is over three times the diameter of the shank may be easily produced by my process, the heads being made at a single blow, if the annealing temperature is in the neighborhood of 1100 or 1200 degrees F. and the heads of the nails will be tough and strong while the shanks and points are sufficiently hard to allow the nails to be easily driven into hard woods.

For producing articles, such as staples or coldheading rivets, which are required to be of practically dead soft steel, the electric heating portion of my machine is adjusted to raise the temperature of the wire to above the critical range, thus producing complete recrystallization of both the ferrite and the pearlite in the steel. In producing staples, for example, heating the wire to a maximum temperature of about 1400 degrees F. has been found to give excellent results.

In all forms of the process, the working of the metal, such as the forming of a head on a nail, bolt blank or rivet or the bending of a staple, takes place at a temperature well above "blue heat," which is the range of temperatures in the vicinity of 500 degrees F. at which steel is brittle. Thus, in the production of staples, I have found that the bending may be done when the wire has cooled down slightly from its annealing temperature and is at a temperature of 900 degrees F.

I have found that in combined machines made in accordance with my invention as described above and including a heating device, the wire fabricating or processing portion of the machine remains in adjustment for a considerably longer period of time than in other combined wire drawing and wire processing machines. Because the various dies are working on metal which is in a semi-plastic condition, the dies wear much more slowly and require attention much less often.

I have also found that my process carried out as described above produces little or no scale on the wire. This is believed to be because the wire is raised in temperature by heat generated within it instead of by contact with much hotter gases surrounding it. The comparative absence of scale results in a great increase in the life of the forming and cutting dies in the fabricating portion of the combined machine and reduces the expense of and the time necessary for cleaning and polishing the product.

I have also found that in combined machines of the type described above and made in accordance with my invention, it is possible to perform operations not previously found to be commercially practical. The formation of large heads on nails such as shingle nails, roofing nails and the like mentioned above, in a single blow machine is an example of this, and the heads of nails produced in my machine are less brittle and less apt to break than the heads of nails produced in other machines.

While I have shown and described in detail only two or three ways of carrying out my invention, the invention in its broadest aspect is not limited thereto but may include other forms of wire fabricating or processing machines, such as fence making machines or wire galvanizing machines, and other forms of annealing devices, such as those operating by induction of a current in the wire rather than by the introduction of a current from an outside source, and is limited only by the scope of the following claims.

I claim as my invention:

1. The method of fabricating wire articles whose major portions have a uniform diameter which comprises establishing a heating zone, continuously drawing continuous metal stock down to said diameter and thereby raising its temperature, passing the drawn stock immediately and continuously through the heating zone and generating sufficient additional heat within said stock while in said heating zone to further raise its temperature to a predetermined level, intermittently processing the wire into the finished article while it retains a major part of the heat imparted to it during the preceding step, and taking up slack in the continuously moving wire from the heating zone between the intermittent processing steps.

2. The method of forming elongated metal fastening elements having heads larger than their bodies which comprises establishing a heating zone, continuously drawing continuous metal stock down to the diameter of said bodies and thereby raising its temperature, passing the drawn stock immediately thereafter and continuously through the heating zone and generating sufficient additional heat within said stock while in said heating zone to further raise its temperature until it reaches a predetermined level, and repeatedly upsetting the end of said stock and cutting off the proper length to form one of said elements before the end portion of the stock cools down below its forging temperature range.

3. The method of forming metal staples whose major portions have uniform diameters which comprises establishing a heating zone, continuously drawing continuous ferrous metal stock down to said diameter and thereby raising its temperature, passing the drawn stock immediately thereafter and continuously through the heating zone and generating sufficient additional heat within said stock while in said heating zone to further raise its temperature through the lower critical range, and repeatedly bending the end portion of said stock and severing it from the rest of said stock to form a staple before it cools down below its forging temperature range.

4. The method of forming wrought metal fastening elements whose major portions have uniform diameters which comprises establishing a heating zone, continuously drawing continuous metal stock down to said diameter, passing the drawn stock continuously through the heating zone and generating sufficient heat within said stock while in said heating zone to raise it to a predetermined level, and repeatedly forming the end portion of the stock into one of said fastening elements and severing it from the rest of the stock before it cools down below its forging temperature range.

5. The method of forming elongated metal elements having heads larger than their bodies which comprises establishing a heating zone, continuously drawing continuous metal stock down to the size of said bodies, passing the drawn stock continuously through the heating zone and generating sufficient heat within said drawn stock while in said heating zone to raise it to a predetermined level, and repeatedly upsetting the end of said stock and cutting off the proper length to form one of said elements before the end portion of the stock cools down below its forging temperature range.

6. The method of forming metal staples which comprises establishing a heating zone, continuously drawing continuous ferrous metal stock down to the diameter of the legs of said staples, passing the drawn stock continuously through the heating zone and generating sufficient heat within said stock while in said heating zone to raise it through its lower critical range, and repeatedly bending the end portion of said stock and severing it from the rest of said stock to form a staple before it cools down below its forging temperature range.

7. The method of forming wrought ferrous metal fastening elements whose major portions have uniform diameters which comprises drawing continuous ferrous metal stock down to said diameter, generating sufficient heat within said drawn stock to raise it to a temperature at which the major portion of the metal may recrystallize, and repeatedly forming the end portion of said stock and cutting it off to form one of said elements before the stock cools down below the temperature range in which internal stresses are relieved.

8. The method of forming elongated metal elements having ends larger than their bodies which comprises drawing continuous metal stock down to the size of said bodies, generating sufficient heat within said drawn stock to raise it to a predetermined level, and repeatedly upsetting the end portion of said stock and cutting off the proper length to form one of said elements before the stock cools down below its forging temperature range.

9. The method of forming metal staples which comprises drawing continuous metal stock down to the diameter of the legs of said staples, generating sufficient heat within said drawn stock to raise it to a temperature above its lower critical range, and repeatedly bending the end portion of said stock and severing it from the rest of said stock to form a staple before it cools down below its forging temperature range.

10. The method of fabricating metal articles which comprises continuously cold drawing metal to form wire of the desired size and hardness, heating the wire to a temperature below its critical range to relieve stresses therein without annealing the wire, and severely working a portion of the heated wire to change the shape thereof, said working operation increasing the temperature of said portion and relieving any stresses caused therein by said working, whereby a tough, unstressed fabricated article is produced having a substantially uniform and fine crystal structure throughout.

11. The method of fabricating ferrous metal articles which comprises continuously cold drawing low carbon ferrous metal to form wire of the desired size and hardness, heating the wire to a temperature below its critical range but high enough to allow recrystallization of the ferrite and relieving of the internal stresses in the steel, and severely working a portion of the heated wire to change the shape thereof, said working operation again heating said portion to a temperature high enough to permit further recrystallization of the ferrite in said portion and to relieve any stresses caused therein by said working, whereby a tough, unstrained fabricated article is produced having a substantially uniform crystal structure throughout composed chiefly of fine undistorted grains of ferrite.

12. The method of fabricating nails which comprises continuously cold drawing low carbon steel rod stock down to form wire of the diameter of the shanks of the nails and thereby securing a fine distribution of the pearlite in the steel, generating enough heat within the wire while the wire is in a relatively cold atmosphere to raise the heat of the wire to a temperature below its critical range, said temperature being high enough to allow at least partial recrystallization of the ferrite into fine polyhedral grains but low enough to prevent recrystallization or agglomeration of the pearlite, upsetting the end of the wire to form a nail-head before the wire has cooled, the heat generated in said head by said upsetting and added to the heat previously generated within the wire being enough to again raise said upset head to a temperature high enough to permit some further recrystallization of the ferrite therein and to at least partially relieve any stresses caused therein by said upsetting without permitting recrystallization or agglomeration of the pearlite, and cutting off the wire to form a point a nail length away from said head whereby a nail is produced with a head substantially tougher than the head of a cold-headed nail and with a shank substantially harder and stronger than the shank of an annealed nail of equal carbon content.

13. The process of making nails having large heads which comprises continuously forming a wire of the diameter of the body of the nail, heating the wire to a low forging temperature without forming scale thereon, holding the heated wire near its end, upsetting the end sufficiently with a single blow to form a head having a diameter at least three times the diameter of the wire before it cools down, severing the wire a nail-length away from the head, and forming the severed end into a point.

14. In an apparatus of the class described, mechanism for drawing wire to be fabricated, mechanism for heating the drawn wire, mechanism for fabricating the heated wire, and means operatively associated with said mechanisms for continuously pulling the drawn wire through the heating mechanism from the drawing mechanism and feeding it to the fabricating mechanism.

15. In an apparatus of the class described, mechanism for continuously drawing continuous metal stock down to a predetermined diameter and thereby raising its temperature, means for continuously raising the temperature of successive portions of said stock from the temperature at which it leaves the drawing mechanism to a predetermined level, mechanism for repeatedly forming the heated end portion of the stock into a fastening device and severing it from the rest of the stock, and mechanism for pulling said stock continuously from said drawing mechanism through said heating means and feeding it to said forming and severing mechanism so rapidly that a substantial portion of the heat generated in each portion of the stock in the drawing mechanism is still present therein when it reaches the heating means and so rapidly that the stock is still at a forging temperature when it reaches the forming and severing mechanism.

16. An apparatus for making elongated metal elements having heads larger than their bodies comprising mechanism for continuously drawing continuous metal stock down to the size of said bodies, means for continuously heating successive portions of said stock to a predetermined temperature as it passes through said means, mechanism for repeatedly upsetting the end of said stock and cutting off the proper length to form one of said elements, and mechanism for pulling said stock continuously from said drawing mechanism through said heating means and feeding it to said upsetting and cutting mechanism before it cools down below its forging temperature range.

17. An apparatus for making metal staples comprising mechanism for continuously drawing continuous metal stock down to the diameter of the legs of said staples, means for continuously heating successive portions of said stock to an annealing temperature as it passes through said means, mechanism for repeatedly bending the end portion of said stock and severing it from the remainder of said stock to form a staple, and mechanism for pulling said stock continuously from said drawing mechanism through said heating means and feeding it to said bending and severing mechanism before it cools down below its forging temperature range.

18. In an apparatus of the class described, mechanism for continuously drawing continuous metal stock down into a wire and thereby heating it, mechanism for forge fabricating the wire into shaped articles, means associated with said mechanisms for continuously pulling the drawn wire from the drawing mechanism and feeding it to the forge fabricating mechanism, a pair of rollers over which said wire is adapted to pass on its way from the drawing mechanism to the fabricating mechanism, and means for maintaining a difference in the electrical potential of said rollers in order to cause current to flow therebetween and further heat said wire so that it will be within its range of forging temperatures when it reaches said fabricating mechanism.

19. In an apparatus of the class described, mechanism for continuously drawing continuous metal stock down into wire and thereby heating it, mechanism for forge fabricating the wire into shaped articles, means associated with said mechanism for continuously pulling the drawn wire from the drawing mechanism and feeding it to the fabricating mechanism, a roller over which said wire is adapted to pass on its way from the drawing mechanism to the fabricating mechanism, a brush adapted to make contact with the wire at a short distance from said roller, and means for maintaining a difference in the electrical potential of said roller and said brush in order to cause current to flow therebetween and further heat said wire so that it will be within its range of forging temperatures when it reaches said fabricating mechanism.

20. In an apparatus of the class described, mechanism for continuously drawing continuous metal stock into wire and thereby heating it, mechanism for fabricating the wire, means associated with said mechanisms for continuously pulling the wire from the drawing mechanism and feeding it to the fabricating mechanism, a pair of spaced rollers over which said wire is adapted to pass on its way from the drawing mechanism to the fabricating mechanism, a brush adapted to make contact with the wire between said rollers, means for maintaining a difference in the electrical potential of said brush and one of said rollers in order to cause current to flow therebetween and further heat said wire so that it will be within its range of forging temperatures when it reaches said fabricating mechanism, and means independent of said wire and forming an electrical connection between said brush and the other of said rollers to prevent arcing at said brush.

21. A brush assembly adapted to provide different contact resistances comprising a prism of conducting material, the sides of said prism being of different widths, and means for holding said brush in different angular positions, the angular differences between said positions being approximately equal to the supplements of the angles between the sides of the prism.

22. In a machine for heating continuously moving wire by passing an electric current along the wire between predetermined points, a device for varying the resistance to the electric current comprising a polygonal brush at one of said predetermined points and forming one electrical contact with the wire, said brush having sides of different widths and being adjustably mounted to enable any selected one of said sides to form the contact with the wire.

23. In a machine for heating continuously moving wire by passing an electric current along the wire between normally stationary points, contacts at said points, means for adjusting one of said contacts along the wire, and means for adjusting the contact resistance of one of said contacts.

24. A machine for fabricating wire articles comprising wire drawing mechanism, wire heating means, mechanism for forming wire into wire articles and including a feeding device which takes in wire intermittently, and means for continuously drawing the wire from the wire drawing mechanism through the heating means and for accumulating wire to be taken in intermittently by the feeding device of the forming mechanism.

25. A machine for fabricating wire articles comprising wire drawing dies, drums for drawing wire through the dies, spaced electric contacts, means for maintaining a potential difference between said contacts, means for guiding wire through said dies and around said drums and over said contacts, a mechanism for forming wire into wire articles and including a feeding device which takes in wire intermittently, and means for maintaining a continuous tension in the wire passing from said contacts to said forming mechanism, the tension maintained in said wire being great enough to pull the wire over said contacts and to prevent slipping on the last wire drawing drum around which the wire passes.

26. A cold drawn nail free of internal stresses and having a greatly enlarged head free from fissures, said nail having substantially the same crystalline structure throughout its body.

27. A low carbon steel nail free of internal stresses, both the head and shank of said nail being composed of ferrite at least partially recrystallized in fine uniform polyhedral grains characteristic of annealed cold drawn steel wire and of pearlite finely distributed in the manner characteristic of unannealed cold drawn steel wire.

PAUL W. DILLON.